United States Patent
Wolff et al.

(10) Patent No.: US 8,161,409 B2
(45) Date of Patent: Apr. 17, 2012

(54) RE-WRITABLE COVER SHEETS FOR COLLECTION MANAGEMENT

(75) Inventors: Gregory J. Wolff, Redwood City, CA (US); John Barrus, Menlo Park, CA (US)

(73) Assignee: Ricoh Co., Ltd., Tokyo (JP)

( * ) Notice: Subject to any disclaimer, the term of this patent is extended or adjusted under 35 U.S.C. 154(b) by 751 days.

(21) Appl. No.: 10/816,251

(22) Filed: Mar. 31, 2004

(65) Prior Publication Data

US 2005/0223331 A1    Oct. 6, 2005

(51) Int. Cl.
G06F 3/048    (2006.01)

(52) U.S. Cl. ............... 715/838; 715/229; 715/839

(58) Field of Classification Search .......... 715/838, 715/839, 229
See application file for complete search history.

(56) References Cited

U.S. PATENT DOCUMENTS

| | | | |
|---|---|---|---|
| 3,713,148 A * | 1/1973 | Cardullo et al. | 342/42 |
| 5,490,217 A * | 2/1996 | Wang et al. | 380/51 |
| 5,682,540 A | 10/1997 | Klotz et al. | |
| 5,764,368 A * | 6/1998 | Shibaki et al. | 358/296 |
| 5,867,821 A * | 2/1999 | Ballantyne et al. | 705/2 |
| 6,260,063 B1 * | 7/2001 | Ludtke et al. | 709/224 |
| 6,373,575 B1 * | 4/2002 | Takayama et al. | 356/445 |
| 6,396,598 B1 * | 5/2002 | Kashiwagi et al. | 358/474 |
| 6,432,518 B1 * | 8/2002 | Torii et al. | 428/195.1 |
| 2002/0052888 A1 * | 5/2002 | Sellen et al. | 707/500 |
| 2002/0064113 A1 * | 5/2002 | Geeslin | 369/53.21 |
| 2002/0167500 A1 | 11/2002 | Gelbman | |
| 2002/0170973 A1 | 11/2002 | Teraura | |

FOREIGN PATENT DOCUMENTS

| | | |
|---|---|---|
| EP | 1327528 A | 7/2003 |
| JP | 2003-208256 | 7/2003 |

OTHER PUBLICATIONS

Japanese Office Action for corresponding Japanese Patent Application No. 2005-104575, Feb. 23, 2010, 2 pgs.
EP Search Report for EP 05003376.0-2202, mailed Jul. 11, 2005, date of completion of search: Jun. 30, 2005, 3 pages.

* cited by examiner

*Primary Examiner* — Andrey Belousov
(74) *Attorney, Agent, or Firm* — Blakely, Sokoloff, Taylor & Zafman LLP

(57) ABSTRACT

A method and apparatus is disclosed herein for using rewritable sheets. In one embodiment, the method comprises representing a first collection of media objects using a first sheet having a first identifier and a first graphical content representing the media objects, creating a second collection of media objects from the first collection of media objects, and re-marking the first sheet to include a second identifier and to have a second graphical content representing the second collection of media objects.

46 Claims, 11 Drawing Sheets

RE-WRITABLE COVER SHEETS FOR COLLECTION MANAGEMENT

FIELD OF THE INVENTION

The present invention relates generally to the field of document management and more specifically to access and dissemination of collections of multimedia documents.

BACKGROUND OF THE INVENTION

Despite the ideal of a paperless environment that the popularization of computers had promised, paper continues to dominate the office landscape. Ironically, the computer itself has been a major contributing source of paper proliferation. The computer simplifies the task of document composition, and thus has enabled even greater numbers of publishers. The computer promotes individual expression through the use of graphics tools, image capture devices, image enhancement tools, and so on, in addition to traditional text editing. Oftentimes, documents must be shared among colleagues, thus generating even more paper.

Despite advances in technology, suitable personal output devices as a practical substitute for paper remain to be developed. Personal data assistants (PDAs such as Palm Pilot® by 3Comm, Inc., and similar hand held devices) typically do not have the storage capacity, the processing capacity, the display capacity, or the connectivity to effectively present documents to the user in a convenient and useful manner. Unlike paper, devices such as PDAs are not universal. While many document formats exist for representing information, not all devices have all the software needed to read all documents. Worse yet, PDA documents typically use formats that are not readily available on a desktop or laptop PC. Usually, documents have to be converted between formats. Thus, paper remains the simplest way in many situations for storing information (e.g., record keeping), distributing information, and controlling access to information.

Paper has been an integral component of civilization for thousands of years. Its replacement is not likely to occur soon, if ever, despite the ubiquity of computer-based technology. Electronic information almost invariably is reduced, at least in part, to paper. Perhaps then, the role of the computer is not to achieve a paperless society. Instead, the role of the computer may be as a tool to move effortlessly between paper and electronic media with which it was created. Generally, there is a need to use computers to more effectively share information and to provide access to that information. In addition, the information should not be limited to any particular mode of expression, allowing for all forms of communication media.

A cover sheet, as used in a TouchVerse™ system of Ricoh Innovations of Menlo Park, Calif., is typically a paper document that provides access to and management of a collection of arbitrary media files. Each cover sheet typically contains a machine-readable identifier for the collection as well as a graphic or image representing the contents of the collection. When a modification occurs to the collection, the graphic that appears on the cover sheet must be changed. However, to reflect those changes, a new paper cover sheet must be printed.

Re-writable or other media are available. For example, Dai Nippon has the G-H PDLC rewritable medium.

Two examples of -like displays, though not rewriteable include Xerox's Gyricon Rotating magnetic balls, which are black on one side and white on the other and where a magnetic field is used to rotate the magnetic bells, which remain in place until a magnet is brought in close proximity to them again. For more information, see http://www.gyricon-media.com/. E-Ink from MIT and Phillips has charged pigment chips in a clear fluid contained in capsules. These chips migrate to the top or bottom depending on magnetization. An example of rewriteable includes magnetic particles embedded in wax. A prototype of this recyclable, rewritable was exhibited at CEATEC Japan 2003 by Shinsho Corporation and Majima Laboratory, Inc in October 2003. The 's rewritable layer, sandwiched between protective layers such as transparent plastic film, consists of magnetic particles embedded in solid wax. The print can be erased and rewritten using a dedicated thermal printer that incorporates a magnet. The rewriting mechanism is based on a specialized printer and the works as follows. From the thermal head of the printer, heat is applied to the rewritable surface of the, melting the wax. The magnetic particles in the heated portion of the wax gravitate toward the magnet located on the opposite side of the thermal head. The wax then cools and solidifies, fixing the magnetic particles drawn toward the magnet. This produces the printed characters, which appear in the color of the magnetic particles. Because the wax has a low melting point (50 degrees Celsius), only the wax melts when the is heated after the plastic film is removed. This allows the wax and the magnetic particles to be easily recovered separately. Both materials can then be reused.

Also, in September 2003, Ricoh Co, Ltd exhibited its 'RECO-View IC-Tag Sheet' at the Auto-ID Expo 2003 event held September 10-12 at the Tokyo Big Sight convention center. The sheet, which features an embedded radio frequency identification (RFID) tag, uses film sheets that can be repeatedly written on and erased by means of thermal printing. The film can be used to display the digital data stored in its own RFID tag.

However, the current re-writable systems function essentially as recyclers. Sheets that have been used are placed into an erasing unit that removes the visible marks from the paper using, for example, a thermal or thermo-magnetic process. The resulting sheets are then made available to the printing process. No attempt is made to scan or use the information from the used sheets prior to erasing and all items placed in the erasing unit are assumed to be the correct re-writable type. Therefore, one downside with the use of these systems is that there is no link between one version of a document and a new version of the same document. Another downside is that if the paper is being tracked (as opposed to the content), then it cannot be tracked through the erasing system. Thus, there is no link between the content and the paper.

Collections of paper documents are used for many purposes. Many people keep folders of documents on their desks or in their file system that are related to a particular task or to a particular person. A law firm keeps a "docket" of papers for a specific case or client. A medical office keeps at least one file of papers for each patient who uses that office. It is important to keep those papers together to facilitate work tasks related to those papers. For instance, in a medical office, if a doctor wishes to review a patient's medical history, she can flip through that patient's folder and look at what tests have been performed or what illnesses the patent has suffered in the past.

The use of paper is prevalent in the medical field. Existing systems for tracking patient information, including paper files and electronic medical records, provide various types of information to health-care providers. In paper charts, these are known as "face sheets" that provide critical information such as allergies, medications, and diagnosis. In paper charts, physicians must update these face sheets manually as well as enter the same information on various encounter forms. This practice is labor intensive and not standardized. Similarly, updating summary information for electronic medical records has not yet been standardized and physicians report spending excessive time trying to navigate electronic records to get a clear picture of vital patient information.

SUMMARY OF THE INVENTION

A method and apparatus is disclosed herein for using rewritable sheets. In one embodiment, the method comprises representing a first collection of media objects using a first sheet having a first identifier and a first graphical content representing the media objects, creating a second collection of media objects from the first collection of media objects, and re-marking the first sheet to include a second identifier and to have a second graphical content representing the second collection of media objects.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
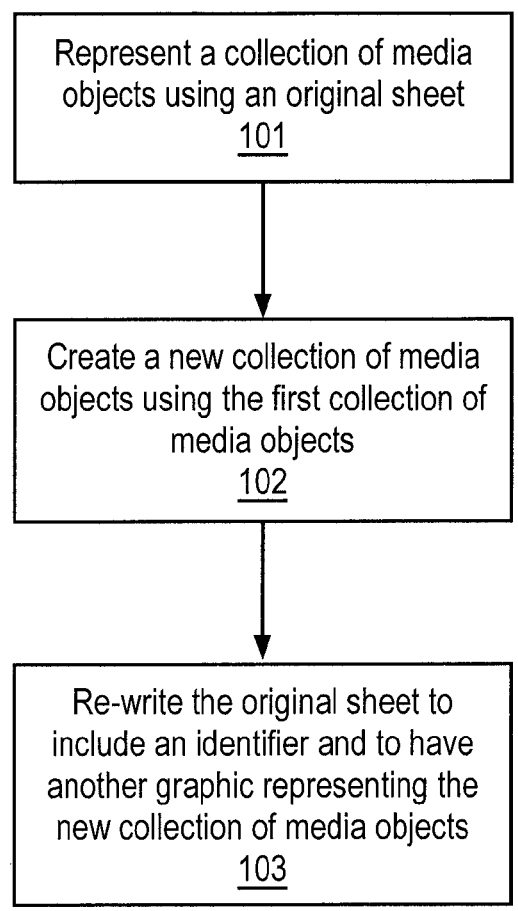
FIG. 1 is a flow diagram of one embodiment of a process for modifying the content of information appearing on a sheet.

A method and apparatus for re-writing cover sheets is described. In one embodiment, the method comprises representing a collection of media objects using an original sheet, creating a new collection of media objects using the first collection of media objects, and re-writing the original sheet to include an identifier and to have another graphic representing the new collection of media objects. The techniques described herein may be used for collection management.

The cover sheet provides access to and management of a collection of arbitrary media objects through the use of an identifier (e.g., a machine-readable identifier, such as, for example, a barcode). Media objects may include scanned documents, images, audio files, text notes, annotations (drawing marks), web pages, and office documents like spreadsheets and presentations. The media objects may be represented by a set of thumbnails on the cover sheet. Other representations may be used.

To handle a change in the graphic or image representing the contents of the collection, a method and system for rewriting a cover sheet is used. In one embodiment, the cover sheet comprises re-writable paper. When a modification occurs to the collection, the re-writable paper is rewritten to include an updated graphic or add a new graphic to the cover sheet to reflect the change in the collection.

The terms "paper," "paper medium," or "sheet" as used in this application are intended to refer to any tangible medium on which information can be formed whether by a printing process, written, drawn, imprinted, embossed, etc. For purposes of this invention, the term "printing" is intended to encompass all manner of forming images on an image-bearing medium whether by optical, mechanical, thermal, or electrical methods, or combinations thereof.

Information is increasingly being captured and kept in electronic form as well. For instance, even through a picture taken with a digital camera can be printed, it originated electronically and could be stored electronically as well. Digital files are easier to copy and move around than paper in many cases. Both paper and electronic media have distinct advantages.

Until now, paper has had to forgo the advantages of electronic media. With the advent of programmable MFPs, or multi-function peripherals, it is much easier to convert paper into electronic form. It is now possible to set up an MFP to acquire pages of a document and convert them into electronic form and store those documents in collections.

Collections in this specification have a specific meaning. A "collection" can include one or more groups of electronic documents or media which might include digital images, audio recordings, scanned images from pages of a document, files like Microsoft Word documents or Microsoft Excel spreadsheets. Collections can also contain pointers to other collections. Collections can include user-provided markings, annotations, and such. Collections can also include metadata representing related information such as date of creation, modification date, access permissions, and so on.

A collection is stored on a collection server and has a specific address or identifier, similar to a URL or uniform resource locator, which identifier is unique and provides a pointer to the collection. A collection has a coversheet that displays a representation of the contents of the collection with an overview image showing thumbnails that represent all of the documents in the collection. More details about collections will be described in another part of this specification.

In one embodiment, the collection may be modified by placing a cover sheet that is printed on re-writable paper along with other documents on the sheet feeder of a multifunction peripheral (MFP) and pressing a button. After scanning the identifier on the cover sheet, a processing unit on the MFP (e.g., an application program running on the MFP) accesses the reference collection, scans the remaining pages (and potentially other media, such as, for example, a memory card from a digital camera which stores images captured by the camera or a memory card from a PDA containing document or audio files), and adds them to the collection. The MFP prints out a new cover sheet with a collection identifier and an updated collection graphic on the re-writable paper.

Thus, the process set forth herein includes scanning a cover sheet to initiate the printing of an updated cover sheet.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Introduction

FIG. 1 is a flow diagram of a process for modifying the content of information appearing on a sheet. The process is performed by processing logic that may comprise hardware (e.g., circuitry, dedicated logic, etc.), software (such as is run on a general purpose computer system or a dedicated machine), or a combination of both.

Referring to FIG. 1, the process begins by processing logic representing a collection of media objects using an original sheet (processing block 101). As discussed above, the sheet may comprise a re-writable piece of paper. The sheet has an identifier and a graphical content representing the media objects. In one embodiment, the identifier comprises a machine-readable identifier (e.g., barcode). Alternatively, the identifier may comprise a radio-frequency identifier (e.g., RFID).

Figure 2:
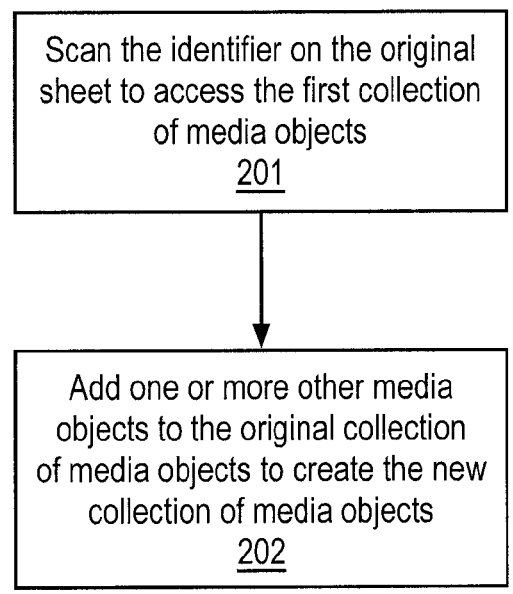
FIG. 2 is a flow diagram of one embodiment of a process for creating a new collection of media objects.

Next, processing logic creates a new collection of media objects using the first collection of media objects (processing block 102). FIG. 2 illustrates one embodiment of a process for creating a new collection of media objects. The process is performed by processing logic that may comprise hardware (e.g., circuitry, dedicated logic, etc.), software (such as is run on a general purpose computer system or a dedicated machine), or a combination of both. Referring to FIG. 2, the process begins by processing logic scanning the identifier on the original sheet to access the first collection of media objects (processing block 201). Note that scanning the identifier on the original sheet occurs after the original sheet has been identified as a sheet that represents a collection of media objects. This typically involves the use of sensing technology to review the scanned input sheets at predetermined locations for the identifier, and after locating an identifier in proper form at the predetermined locations, then concluding that the sheet represents a collection of media objects.

After accessing the first collection of media objects, processing logic adds one or more other media objects to the original collection of media objects to create the new collection of media objects (processing block 202). In one embodiment, to add the one or more media objects, processing logic scans the one or more pages of the one or more other media objects. In one embodiment, the new collection may include additional materials scanned or otherwise referenced during reading of the original cover sheet. Alternatively, the media objects may already be in electronic form and can be added by accessing the memory (e.g., a data base) in which they are stored. If the media objects in the original collection or media objects being added to the collection include machine-readable information, in one embodiment, that information may be converted into an appropriate data format before being submitted to memory.

Figure 3:
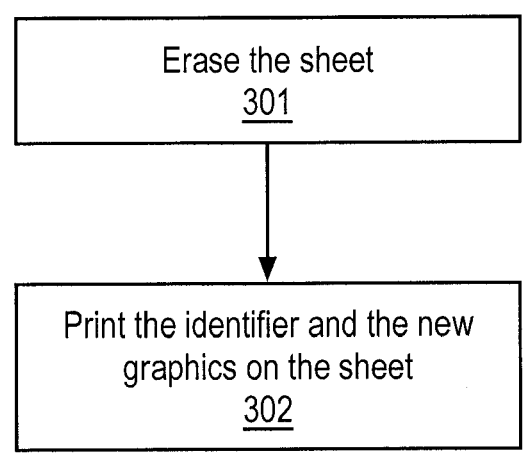
FIG. 3 is a flow diagram of one embodiment of a process for marking a sheet.

Referring back to FIG. 1, using the new collection of media objects, processing logic re-writes or marks the original sheet to include an identifier and to have another graphic representing the new collection of media objects (processing logic 103). FIG. 3 is one embodiment of a process for marking a sheet. The process is performed by processing logic that may comprise hardware (e.g., circuitry, dedicated logic, etc.), software (such as is run on a general purpose computer system or a dedicated machine), or a combination of both.

Referring to FIG. 3, the process begins by processing logic erasing the sheet (processing block 301). The erasing may be limited to erasing a graphic or some other portion less than the full sheet. In one embodiment, erasing the sheet includes determining whether the sheet is erasable. This may be performed by using a special identifier or having the identifier include a flag that indicates to the processing logic that the sheet is erasable. Alternatively, the processing logic may include a sensor that can distinguish between a re-writable substrate and a non-re-writable substrate. For example, the sensor may examine the transmisivity or reflectivity of the sheet to determine if it is a re-writable substrate. More specifically, for example, when imaging the sheet, processing logic may look at the absolute value of the white areas and classify the sheet based on those values.

In an alternative embodiment, erasability can be detected by trying to erase a portion of the document. In such a case, an exemplary method may include operations to 1) scan a small area of a document and store the scanned information for the area in memory; 2) attempt to erase that area; 3) scan the area of the document again; 4) compare the result of this scanning operation with the scanned portion in memory; and 5) restore the document by reprinting original stored image if it was erased or determining the document wasn't erasable if the comparison indicates the two were the same.

After erasing the sheet, processing logic marks or prints the identifier and the new graphic on the sheet (processing block 301). In one embodiment, the identifier is the same identifier as appears on the original sheet. If this is the case, the identifier does not have to be erased as part of the erasing operation (and then rewritten). Alternatively, the identifier is a new identifier different from the identifier appearing on the original sheet.

In one embodiment, erasing is not used and information is simply added to an existing sheet. For example, in a case where thumbnails are to be added to the collection of media objects, no erasing may be necessary and only the addition of one or more graphics is performed by re-writing the sheet to include the graphic(s).

In one embodiment, re-marking the first sheet only occurs in a first mode of operation. The re-marking may include writing a new graphic and a new identifier. The new graphic may replace the graphic that was on the original document or may be an additional graphic that is added to the sheet. In a second mode of operation, a second graphic and the second identifier is printed on a different sheet. In such a case, the original sheet is either discarded or erased and stored in a paper bin for use in subsequent re-writing. Note that in the second mode, the second graphic and the second identifier may be printed on the new sheet at the same time the original sheet is being erased. The modes of operation may be user-selectable via a button or other input mechanism on a user interface of a system (e.g., MFP).

The scanned image may be used to identify open areas on the sheet where representations of additional media objects may be added.

Figure 4A:
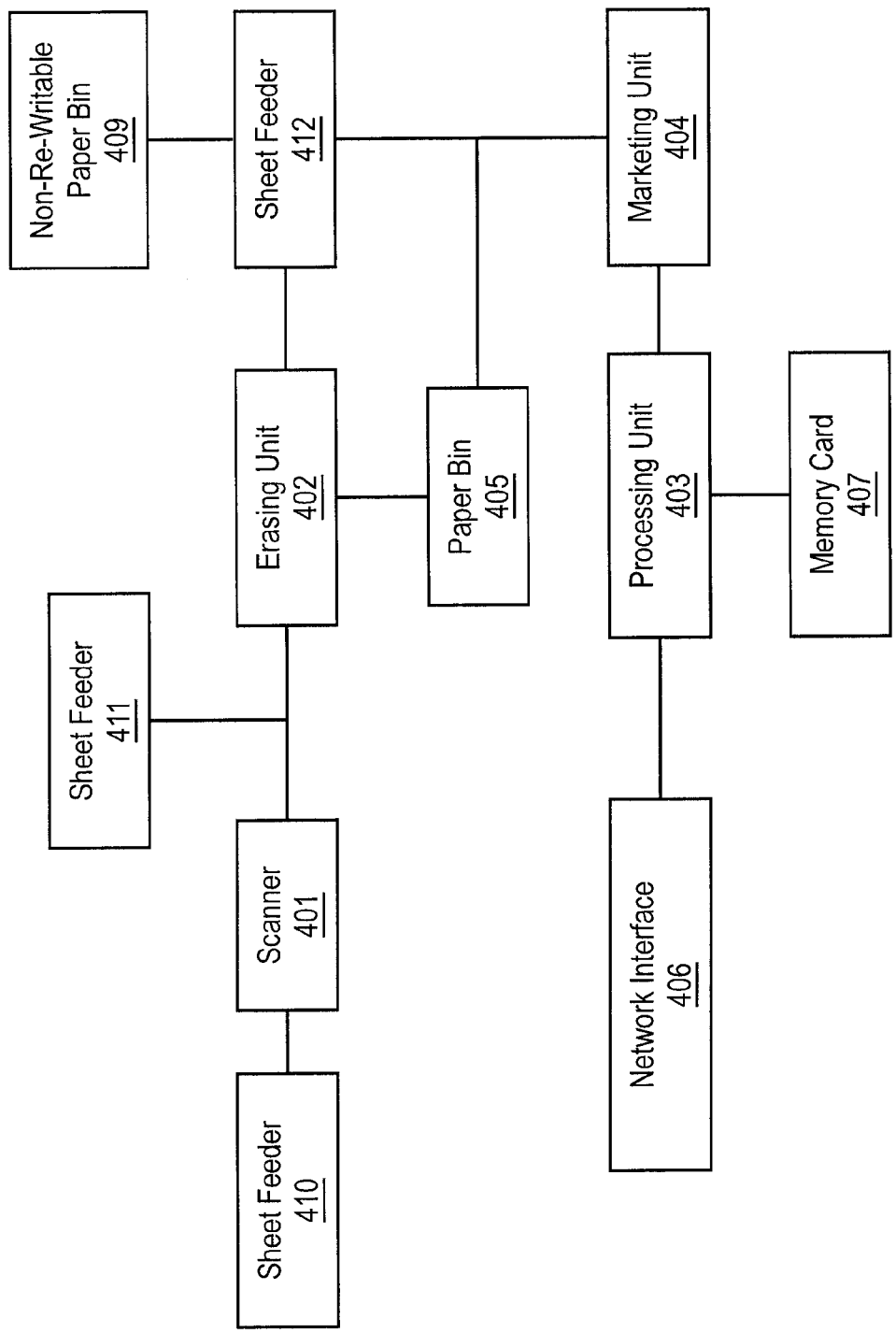
FIG. 4A is a block diagram of a system.

In one embodiment, the processing logic is implemented with a system, such as shown, for example, in FIG. 4A. Referring to FIG. 4A, system 400 comprises a scanner 401 to scan a sheet having the identifier printed on it and having a first collection of media objects represented by a graphic. Optionally, system 400 may include a sheet feeder 410 to supply the sheet to scanner 401.

System 400 also optionally includes an erasing unit 402 that is coupled to receive the sheet from the scanner to erase the sheet. Erasing unit 402 may be coupled to scanner 401 via a sheet feeder, such as sheet feeder 411, which receives the original sheet after it has been scanned by scanner 401 and then forwards it to erasing unit 402 to be erased. The erasing may be performed in a manner well known in the art. For example, in one embodiment, the paper operates based on particular temperatures and is erased based on those temperatures. More specifically, the paper shows marks at a temperature T1 and those marks disappear at a higher temperature T2. In such a case, to erase a page, the page is heated to temperature T2. As the paper gets to temperature T1, the entire page becomes dark, and then at temperature T2, the page goes blank again. In cases of using magnetic-based paper, such as, for example, Gyricon and E-Ink, erasing is performed by applying a magnet to rotate the balls or move charged particles.

The erased sheet may then be forwarded to marking unit 404 via sheet feeder 412. Alternatively, the erased sheet may be discarded or forwarded to a sheet bin 405 for subsequent use. In one embodiment, sheet feeder 412 is able to take re-writable sheets from erasing unit 402 or non-re-writable sheets from a bin (e.g., a paper bin). In this manner, system 400 is able to intermingle non-re-writable sheets with re-writable ones.

Erasing unit 402 is not required in cases where an additional graphic representing the new collection of media objects is added to the sheet without removing the graphic that appeared on the sheet that represented the original collection of media objects.

System 400 also includes a processing unit 403 to modify a collection of media objects by adding one or more pages of the one or more other media objects to the collection of media objects to create a new collection of media objects. Marking unit 404 re-marks the sheet with a new identifier and new graphic representing the new collection of media objects. In one embodiment, a sheet feeder may feed printing unit 404 a new sheet upon which to print the new identifier and the new graphic in response to a request from processing unit 403.

Processing unit 403 may also cause the new graphic to be added to the original sheet such that the original graphic and the new graphic both appear on the sheet and together represent the new collection of media objects. In one embodiment, processing unit 403 is able to add the new graphic to the sheet without obscuring the original graphic because processing unit 403 knows the location of the original graphic on the sheet. Processing unit 403 knows the location of the original graphic because the location of the original graphic is stored and accessed using the identifier that appears on the sheet. Processing unit 403 can know the location of the original graphic by looking in the scanned image. For instance, when adding media objects to a collection, the processor can just look for blank space in the scanned collection overview.

Note that in one embodiment, processing unit 403 and printer 404 may be combined into a marking engine. Thus, there is a single paper path from sheet feeder 410, to scanner 401, to erasing unit 402, to the marking engine (processing unit 403 and marking unit 404). Even if no erasing is performed, such as in the case where an additional graphic is marked onto the sheet, a single paper path remains from sheet feeder 410 to marking unit 404.

The system may optionally include network interface 406 and memory card 407, both coupled to processing unit 403.

Figure 4B:
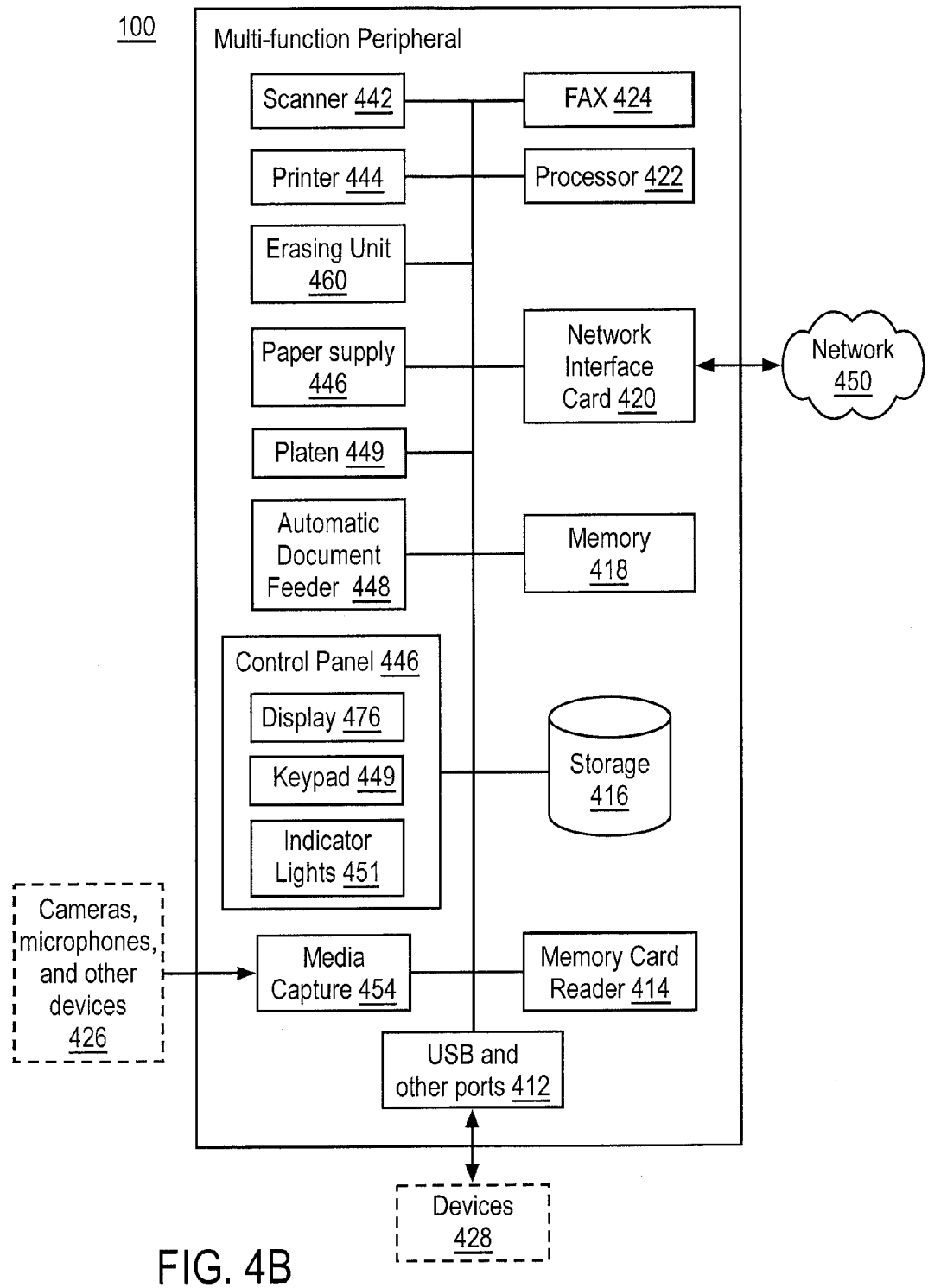
FIG. 4B illustrates an example of a typical MFP.

In one embodiment, the system of FIG. 4A is implemented as a multifunction peripheral (MFP). FIG. 4B is an illustrative example of a typical MFP. Referring to FIG. 4B, the MFP is made up of various components, some of which are not required in the operation of this invention. The MFP has a scanner 442 which can image pages of a document and in conjunction with the automatic document feeder 448 can image multiple pages rapidly. Images of pages can be stored in a non-volatile storage area 416, which might be a disk drive or in any other memory storage area like the memory 418. The MFP also contains a printer or marking mechanism 444, which can retrieve paper from the paper supply 446 and print images, which are stored in the memory 418, storage 416, obtained directly from the scanner 442, obtained from the processor 422 or from the network interface card 420, which can receive image print requests and images from the external network 450. Images to be printed can also come from the memory card reader 414, media capture devices 426 and 428 through a media capture port 454 or a USB or other port 452. Images can also be received or sent out through the fax interface 424.

The MFP also optionally includes an erasing unit 460 to erase re-writable paper and store the erased paper into the paper supply 446 or provide it directly to printer 444.

The MFP can access other forms of media through electronic data input peripherals which may include magnetic readers for magnetic media such as floppy disks, magnetic tape, fixed hard disks, removable hard disks, memory cards, and so on. Peripherals may also include optical media readers for optical storage media such as CDs, DVDs, magneto-optical disks, and the like. Information obtained from these peripherals can be incorporated otherwise associated with scanned-in documents to enhance the document content.

The processor 422 controls the operation of the MFP components shown in FIG. 4B. The control panel 446 having a display 476, a keypad 489 and indicator lights 451 can be used to instruct the processor 422 to use the components of the MFP to make copies, scan documents or print faxes. MFPs are available from many companies, including Ricoh Company, Ltd. in Tokyo, Japan, which makes a programmable MFP called the Aficio 2035 S/P, which contains many of the components shown in FIG. 4B. Such an MFP can be modified to include the marking engine and optional erasing engine described herein. Any suitably equipped MFP could be used in practicing this invention.

The memory 418 of the MFP contains modules that allow the operation of the MFP as well as the practice of the present invention.

Figure 4C:
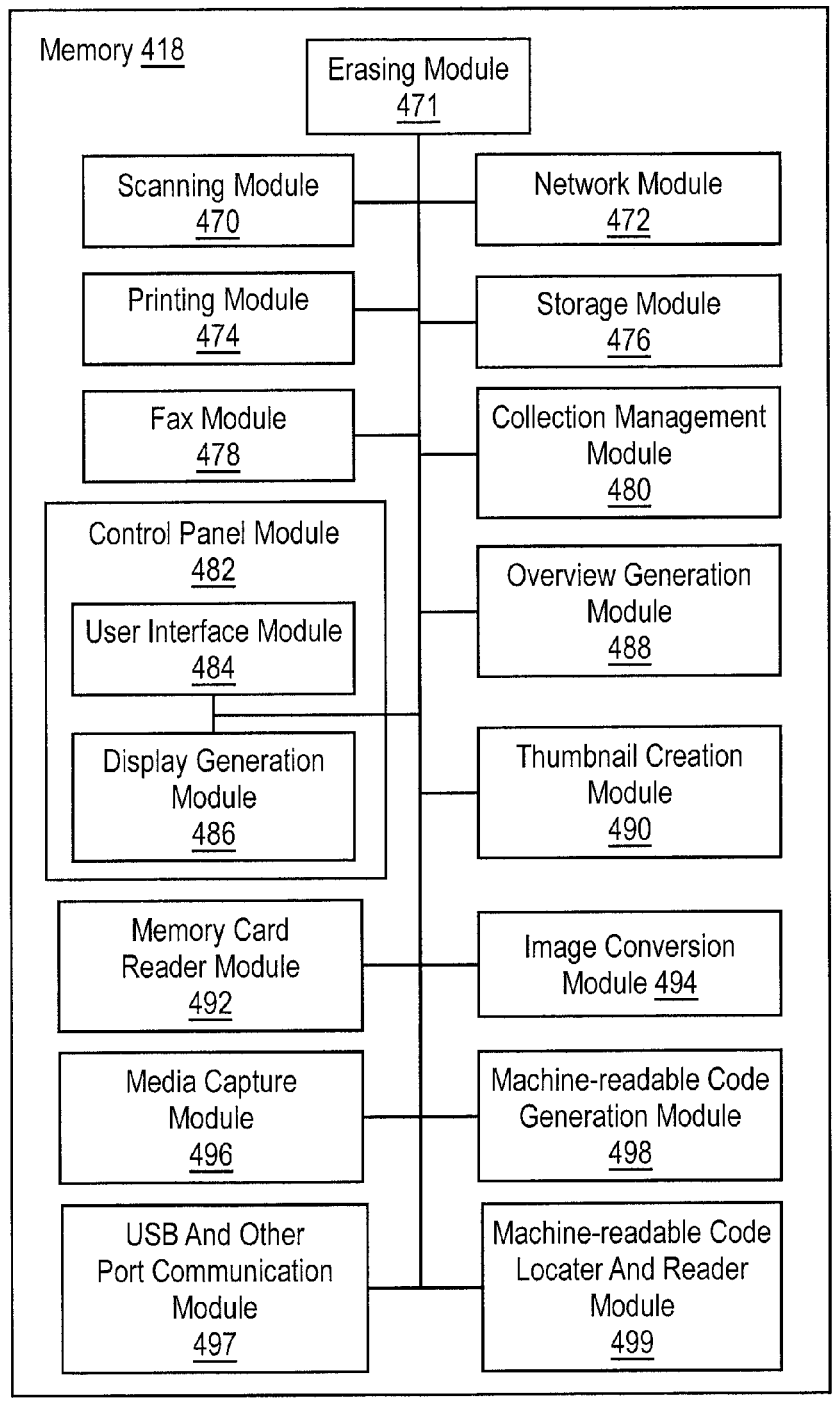
FIG. 4C is a high level representation of various program modules for operating an MFP.

FIG. 4C is a high level representation of various program modules resident in memory 418 for operating the MFP in accordance with the different aspects of the present invention. The scanning module 470 contains the instructions that the processor 422 in combination with the scanner 442 can use to scan pages of documents. The printing module 474 contains control instructions for receiving an image or a description of an image and driving the printer 444 causing the image to be printed on a piece of paper. MFPs are known in the art and made by many different companies so a complete description of the operation of the MFP is not necessary. The fax 478, network 472, storage 476, image conversion 494, memory card reader 492, media capture 496, USB and other port 497 modules will not be described because their purpose and function is well understood.

In addition to the typical MFP functions, the following modules are used for the operation of this invention. A collection management module 480 must be available, which tells the processor how to communicate with the collection server and how to create and modify collections.

A thumbnail creation module 490 can create thumbnail representations of media, including a smaller version of an image, a single-frame from a video or even a waveform from a stored audio signal. These thumbnails are used at least by the overview generation module 488, which is used to create an overview of a collection. The overview is described in detail later and the overview generation module puts together the thumbnails representing the documents and media into a single image that can be displayed or printed and used for accessing the documents and media.

The machine-readable code generation module 498 provides the MFP with the ability to create machine-readable codes like barcodes that represent specific collections. The machine-readable code locator/reader module can be used to find and decode machine-readable codes on collection coversheets in order to determine which coversheet was scanned by the scanning mechanism 442. Preferably, machine-readable codes are barcodes, though there are many ways of creating machine-readable indicia. Barcodes are robust and take up little space and are easily decoded using standard hardware and software. One company that sells software for locating and decoding a variety of barcodes is Tasman Software of Leeds, United Kingdom. Software for creating and printing barcodes can be purchased from IDAutomation.com, Inc. of Tampa, Fla. Decoding machine-readable codes is well known in the industry.

Erasing module 471 can cause a re-writable sheet to be erased and then cause the erased sheet to be stored in the paper supply or directed to the printer.

The control panel is controlled by the processor 422 using information from the user interface module 484 and the display generation module 486, which are part of the control panel module 482.

Coversheets

A collection coversheet is a paper that represents a collection and, in one embodiment, comprises a header, a string of text printed in a machine-readable format, a collection overview image, optionally, an area in which notes may be written, and optionally a human-readable version of the text encoded in the machine-readable code.

Figure 6:
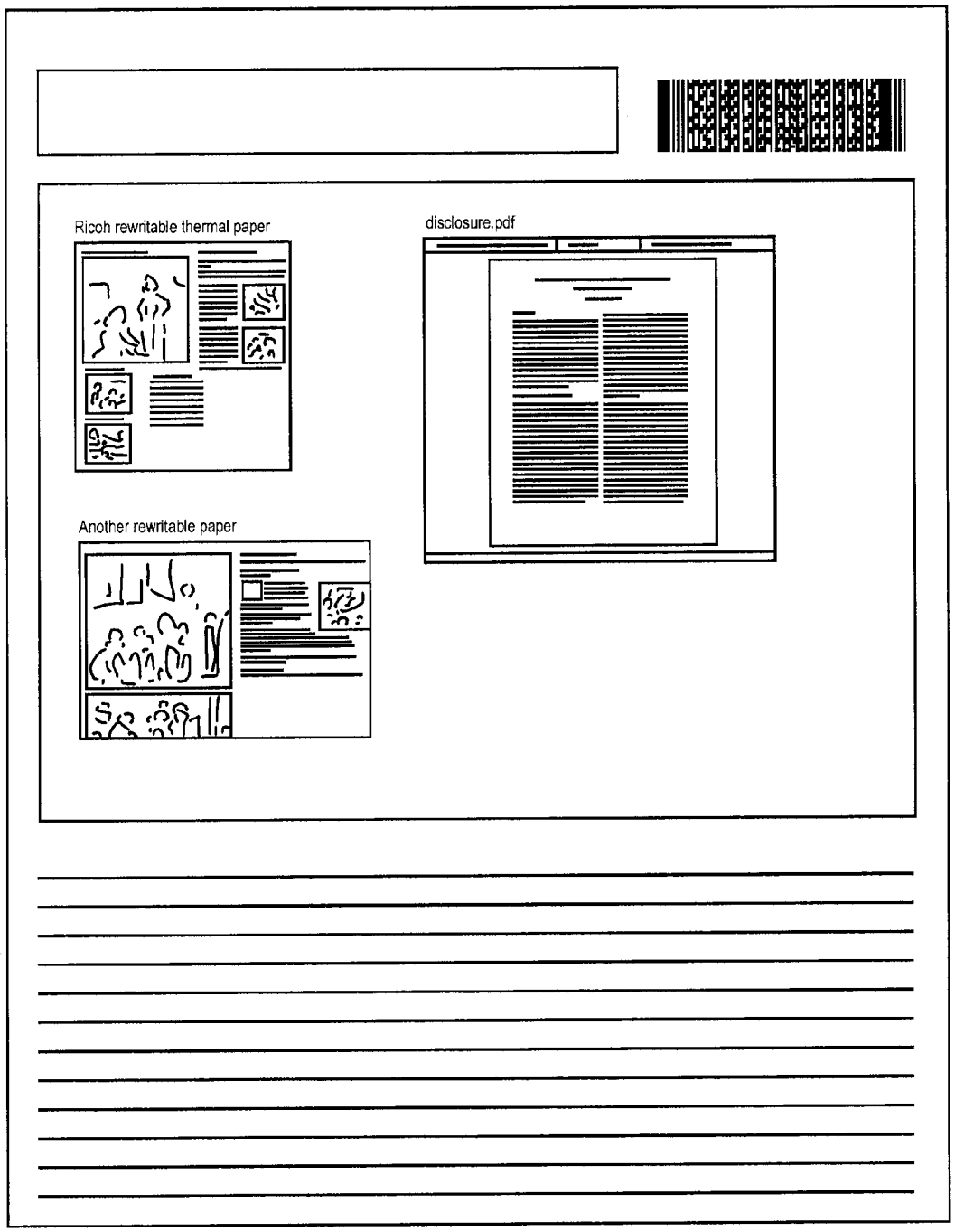
FIG. 6 illustrates an exemplary cover sheet representing a collection of information about re-writable paper.

FIG. 6 illustrates an exemplary cover sheet representing a collection of information about re-writable paper.

The header contains printed information about the collection. This information may include the author of the collection, a list of zero, one or more people who will be notified if the collection is modified, time and date information about when the collection was last modified or when this coversheet was printed out, and an optional collection topic or subject.

In one embodiment, the machine-readable code contains an encoded version of a unique pointer to the collection on the collection server. In one embodiment, this same pointer when presented in the human-readable form is similar to a uniform resource locator or URL used in the World Wide Web and is referred to herein as a collection identifier, distributed resource identifier, or DRI. In one embodiment, a collection server uses these DRIs as unique collection pointers. In one embodiment, DRIs are globally unique, difficult to guess, and can provide access to collections from anywhere on the Internet.

Within this specification, the terms "collection identifier," "distributed resource identifier," and "DRI" will be used interchangeably and should be understood to mean the same thing—a unique identifier that points to a collection of media and documents stored on a collection server. Also, the identifier might be written in human-readable form or machine-readable form. Both printed forms represent the same identifier and point to the same collection even though they look unlike each other.

In one embodiment, the DRI used for a collection points to a directory that contains the collection of documents as well as information used to build the collection overview and some additional metadata. DRIs can also point directly to an individual file the same way that a URL can point to either a directory or a file.

Since a collection typically comprises a multitude of documents, the DRI is often a directory reference rather than a reference to a particular file. For example, in an OS (operating system) such as Unix, the DRI can be a directory reference such as /usr/collection. Alternatively, the DRI can refer to a file that in turn leads to an identification of the constituent elements of a collection. In still another alternative, the DRI can be a reference to a database that stores the collection.

The text of the DRI 510 may comprise a string of characters that includes a random text component. This randomly (and thus, unguessable) generated text serves to prevent access to a collection because it is virtually impossible to guess.

The example DRI "/root/usr/collection" assumes a single-machine architecture. In a more generalized configuration of two or more machines, the DRI can include a machine name component. For example, a more accessible format such as the URL (universal resource locator) format for identifying World Wide Web (WWW) pages might be suitable. In one embodiment, the DRI constitutes the path portion of the URL. Purely by convention, the path portion uses the following naming format according to a particular embodiment of this aspect of the present invention:

. . . /-DDS-/ORIGIN/ . . . , where DDS is the name of a particular repository of collections, and ORIGIN is the fully qualified hostname of the original server for the collection identified by the DRI.

Thus, for example, a collection may be identified by the following URL:

http://machine1.com/-msg-/machine2.com/2002/1022/298hy9y8h8#$30er#/1/

The IP address of the machine is identified by "machine1.com". The path portion refers to a collection stored in a repository named "-msg-". The original copy of the collection (i.e., its place of creation) is located on a machine named "machine2.com". Thus, in this case, "machine1" contains a copy of the collection. In one embodiment, collections are contained in directories, though other data storage conventions can be used; e.g., collections can be stored and managed in a database. The collection shown in the example above is stored in a directory called:

"/2002/1022/298hy9y8h8#$30er#/1/."

The pathname portion "/2002/1022" represents a date; e.g., date of creation of the collection. The string "398hy9y8h8#$30er#" represents randomly generated text. Finally, as will be discussed below, the directory represented by the terminal pathname "/1/" refers to the first (initial, original, base, etc.) version of the collection.

In one embodiment, both the host machine ("machine1") and the original machine ("machine2") use the following directory structure and URL naming structure. The host machine has a directory called "-msg-" contained in its respective "root" directory for storing collections. The "-msg-" directory has a sub-directory called "machine2.com" which contains all the collections originating on "machine2.com". Generally, a sub-directory is provided for each machine that can be an originator of a collection.

Given the DRI, a person or machine will have enough information to access the collection in order to add to or modify the collection.

Using a 2-D bar code representation of a DRI allows for automated access to the collection without requiring the user to manually enter the location. It can be appreciated of course that any machine-readable indicium can be used instead of a bar code system, including optical character recognition (OCR) of the human-readable DRI.

Using the MFP and/or the processing logic and the techniques described herein, it is possible to create and modify collections on a collection server. A new, empty collection can be created. A new non-empty collection can be created using available documents and media. Electronic media and paper documents can be added to existing collections. A collection can be printed. Collections can be added to or merged. Also, actions can be taken on individual media in a collection using notes or actions selected on the coversheet.

In one embodiment, scalable vector graphics files or SVG files are used to represent the collection overview. SVG files are a standard way of creating a visual representation on the World Wide Web and there are many viewers and tools for creating SVG. A collection preferably includes a specially name SVG file which can be used to construct an overview image for the coversheet or any display. In one embodiment, the SVG file includes information for displaying the thumbnails of individual documents and media stored in the collection.

Metadata about the individual files in the collection and their relationship to other files in the collection is stored preferably in an XML (extensible markup language) file. In one embodiment, this information includes image width and height, links between images and their thumbnails and links between a document and an image representing that document. The exact format is unimportant as long as the collection server understands how to read and write the format.

Additional information related to the collection as a whole can also be stored in the metadata file. This information might include the time at which the message was created, the subject of the message, the name of the author of the collection, and contact information such as email addresses, fax numbers, etc. belonging to those who should be notified when a collection is altered.

While creating a new collection, either a printout is generated or the information about the new collection, including at least the DRI is emailed or faxed to someone. Otherwise, the DRI will be lost to all but the collection server and will not be available for adding documents because no one will have or be able to guess the DRI.

The MFP contacts the collection server through a network to request a new collection identifier or DRI. It should be understood that it is possible for the MFP to request identifiers in advance so that if the collection server is busy or temporarily offline, the MFP can still create new collections.

If the coversheet is to be printed, then the MFP composes a coversheet. In one embodiment, a header block is created including at least the date and time of the creation of the new collection. The DRI or identifier obtained from the collection server is added to the coversheet at the bottom in human-readable form and then encoded in an industry standard two-dimensional PDF417 type barcode in one embodiment and added to the upper right-hand corner of the coversheet. An SVG representing the overview is converted to image form and added to the appropriate place in the coversheet. Additional information might also be added as deemed appropriate. The composition of the coversheet described here is one possibility but anyone skilled in the art will recognize that there are many ways to lay out or compose a coversheet that are within the scope of this invention.

The task of adding to an existing collection requires a collection to exist. To add to that collection at the MFP, the user uses a coversheet from the existing collection. As mentioned, each collection identifier represents a single collection but collections can change over time. In one embodiment, each time a collection changes, the last path element in the DRI is modified. Those who have access to a single collection are thereby easily given access to all versions of that collection. In one embodiment, the version name or final pathname of /0/has a special significance and means the "latest" or "most recently created" version.

In one embodiment, pathname /1/indicates the first version of the collection, /2/represents the second version, etc. When a new collection is uploaded to the collection server, a new directory using the next integer is created. The next collection after /2/ would preferably be called /3/. In order to maintain unique version numbers, it is essential that only one device, i.e., the collection server, create the version number of final pathname. The version number cannot be created by the MFP because multiple MFPs might generate a number at the same time and choose the same name. Instead, the MFPs create a collection and upload it to a temporary directory on the collection server and when everything is uploaded, the collection server moves it into place and assigns the final pathname.

If the user has additional paper documents, they can be placed on an automatic document feeder. If the user has images or other documents in a memory card or some other media, the media can be placed in the appropriate reader.

If the user wishes to create some electronic media at the time of the creation of the new collection, the user records audio, video, still images, or other electronic media using any of the microphone, a digital camera, video camera, or other media-capturing device may be used.

Each DRI is associated with the page of the document or image in which it was found. However, the MFP can recognize that a page containing a DRI represents a collection. Putting a page with a DRI into any collection, new or existing, could be understood as a request to add that collection to the new collection. In other words, the page containing the DRI represents a request to add the collection pointed to by that DRI to the new collection. The overview image of that collection will be retrieved and added as a thumbnail to the new collection and the subject of that collection will be used as the title for the thumbnail.

Because this is a new collection, one or more new identification numbers are requested and received from the collection server. In one embodiment, only a single collection identifier is needed for a new collection.

Each document or page that was found to contain a DRI in machine-readable form is replaced with an image representing the collection pointed to by that DRI.

A thumbnail is created for each page or document or other media. The thumbnail is preferably a smaller version of the page that is similar in appearance but smaller in storage size and in number of pixels. With recorded audio, a thumbnail is just a representation of the audio and could be a waveform or even a standard computer icon representing the audio. In the preferred embodiment, the audio could be displayed as a rectangle containing a waveform whose shape is based on the audio content and whose length corresponds to the duration of the audio recording. A video thumbnail could be a single frame or a small number of representative frames from the video composited into a single small image. Those who are skilled in the art will understand that there are many various ways of creating thumbnails to represent media. Each collection coversheet was replaced with a collection overview image that is now reduced to form a thumbnail.

All of the media and documents for the new collection are now added to the collection, which means that they are uploaded to the collection server and placed in the directory pointed to by the DRI of the new collection. There are many well-known protocols for uploading files to a server, including FTP, SCP, HTTP PUT. Preferably, the HTTP PUT protocol is used which allows the MFP to specify the location and contents of each media file as it is being uploaded.

The thumbnails representing the new media items are arranged in the collection overview. The thumbnails are placed in an appropriate manner within the overview, expanding the overview size if necessary.

The SVG file representing the overview is written and uploaded to the collection server and all of the thumbnails are uploaded.

One method for placing thumbnails is to find a place in the overview image where the thumbnail can be positioned where it will not overlap any other thumbnail. An exhaustive search—moving the thumbnail to different positions within the overview and looking for overlaps with other thumbnails—is too slow. Another approach is to reduce the problem to that of placing a single point. This can be done by reducing the size of the overview by the width and height of the thumbnail to be placed and enlarging the existing thumbnails by the same dimensions. The origin of the new thumbnail can be placed anywhere within the remaining space in the overview without overlapping existing thumbnails. This is known as a "configuration space" approach because instead of finding a new thumbnail location in the original two dimensional space of the overview, a new "available-space" region is calculated in which the origin of the thumbnail is placed instead of the entire thumbnail. Configuration space techniques for interference checking are well known in the field of robotics and path planning.

The size of the thumbnail to be added to the overview is determined. Thumbnail sizes are usually measured in pixels. Often thumbnails are chosen to be some standard size—chosen so that they neither the width nor height is larger than a certain maximum size—perhaps 150 pixels for standard display resolutions or two inches for printed thumbnails. Since some images might have a very large or very small aspect ratio. It might be more appropriate to limit the thumbnail to a maximum area—square pixels or square inches—rather than a maximum width and height.

Scaling an image so that it contains no more than some total number of pixels instead of restricting the width and height to be less than some maximum improves the overall appearance of the thumbnails and is the preferred method of selecting a thumbnail size. However, any method for choosing thumbnail sizes can be used for the present invention.

In one embodiment, a single bounding box for all the thumbnails previously placed on the overview is calculated and the origin of the new thumbnail is placed outside of that bounding box. It is also possible and understood by extension that instead of calculating just a single bounding box, an individual bounding box for each thumbnail may be calculated and extended so that the new thumbnail can be placed in any available position in the overview. This is well understood by those experienced with path planning algorithms and would be analogous to allowing a machine to travel between obstacles instead of requiring the robot to go around all the obstacles.

Adding a second new thumbnail now to the overview could be accomplished. However, instead of adding one bounding box to cover all the thumbnails, simply adding a single box representative of the newly added thumbnail is the preferred approach. This box is calculated to be the size of the newly added thumbnail and then is extended up and to the left by the width and height of the thumbnail to be added, just like the first bounding box.

All new thumbnails are uploaded to the collection server as well as the new overview description file and metadata file.

Modifying the overview could be accomplished using an object-based drawing tool like those available in Microsoft's PowerPoint software or Adobe Illustrator or similar tools. These tools and techniques are well understood by those skilled in the art.

All modified information is sent to the collection server, including the metadata files, SVG overview file, and any changes in the collection.

The user may bring media to the MFP or creates it using media recording devices or the like connected to the MFP or to the network.

The advantage of having a machine-readable collection identifier on a coversheet is that the MFP or any device that can locate and decode machine-readable codes can determine which collection is represented by the coversheet. The user can indicate which collection the new media will be added to by typing in a collection identifier or DRI but this can be a difficult task because DRIs tend to be long random strings of characters. DRI's can be located and decoded from a scanned image or read using handheld barcode scanners if they are encoded in barcode format. Handheld scanners which read many different types of one and two-dimensional barcodes are available from many companies like Hewlett-Packard Company of Palo Alto, Calif., USA. They can also be read in text form using optical character recognition technology or decoded from a magnetic strip if properly encoded. If a coversheet of the collection is available, the coversheet should be placed on the MFP where it can be scanned, either in the automatic document feeder or directly on the glass platen. Alternatively, the barcode can be scanned using a handheld scanner. If the barcode has been captured in a digital image, perhaps using a digital camera, the camera can be directly connected to the MFP or a memory card from the camera can be plugged into a card reader. There are many other methods for presenting the MFP with a machine-readable DRI and those methods and techniques are not enumerated herein because they are understood by those skilled in the art.

In one embodiment, a machine-readable DRI is presented as part of the coversheet of the collection. In one embodiment, the DRI is contained in PDF417 format two-dimensional barcode on the coversheet and the coversheet is placed on an automatic document feeder (ADF) of the MFP. Additional documents or pages to be added to the collection are placed behind the coversheet. The additional pages can be any document pages or they can be coversheets of other messages.

Each of the documents and media is searched for a machine-readable DRI. When a bar-coded DRI is scanned using a handheld scanner, the DRI can be stored in the memory of the MFP so that it can be accessed when it is time to determine which collection to add the new media to. If the ADF or a platen has been used to scan in a coversheet or if the DRI is contained in an image from the digital camera, the DRI will have to be read from the scanned r captured image. Either source of a DRI is acceptable and typically, if there is no DRI held in a memory due to hand scanning of a coversheet, the first scanned sheet or first image will contain the DRI. Those skilled in the art will recognize that there are many ways of providing the DRI to the MFP an exhaustive list need not be provided.

The entire image media including images that are scans of document pages is searched for machine-readable codes. Typically, when adding a page or document to a collection, the image of that page is added to the collection storage area and a thumbnail is added to the overview. If that page happens to contain a machine-readable DRI then based on the users preference, instead of adding the page to the collection, the collection that the DRI represents can be added to the collection. For each page or image containing a DRI, the "page add" request is converted into a "collection add" request with the appropriate DRI representing the collection.

Thumbnails are created for all of the new images, documents, pages, and media. For those pages that represent other collections, thumbnails are made for the collections instead of the page. All collected media is uploaded to the collection server.

It is important that the existing collection be changed in a way that makes the current state or version of the collection available at a later time. The new media should not be placed in the same storage area as the existing collection.

Typically, new media and thumbnails in a collection are uploaded to a staging area on the collection server. The staging area is associated with the collection identifier but doesn't have a permanent final pathname. As soon as all of the information has been uploaded and is complete, the collection server moves the collection into a final directory or storage area with a permanent final pathname. The permanent final pathname is usually the next integer after the most recently uploaded collection.

The thumbnails representing the new media are added to the collection overview.

The thumbnails, metadata, and the overview SVG file, are uploaded to the staging area in the collection server. All changes and modifications are finally uploaded to the collection server and at this point, the server has everything required to move the collection out of the staging area and into the final directory upon assigning a version number.

A collection server can keep a mapping of collection identifiers to collection directories.

An Exemplary Application

In one embodiment, each sheet, or group of sheets, represents information about a patient (e.g., a medical file). This information could include any information about a patient stored in a database or other format accessible via a patient identifier. In such a case, re-writing or marking the sheet may be performed to update the information (e.g., the medical file) of a patient. In other words, the collection of media objects represented by the sheet comprises patient objects regarding a patient, which is updated to add one or more additional media objects to create a new set of patient objects corresponding to an updated version of the medical file for the patient.

In one embodiment, only a portion of the sheet representing patient information may be re-written. This enables the content of a medical file for the patient to include an on-going record of the patient's information and medical history. In such a case, the sheet is only written for the purposes of adding additional material to the sheet. Thus, a graphic, which represents a collection of one or more media objects, that is already on the sheet remains unchanged after the sheet has been re-written and any new graphic added to the sheet is written onto the sheet so as to not obscure any graphic already on the sheet.

In one embodiment, the MFP in other systems, such as depicted in FIGS. 4A and 4B may include a connection to a database or medical records system. In one embodiment, with respect to updating information in a database, the identifier or the contents of the collection includes a key that corresponds to an index entry in a database. When items are added to the collection, the collection manager may use such a key to add items into a database. In one embodiment, it notifies and records the existence of an updated collection in the database. The mechanism for communication with the database can be fixed for a particular collection manager or some information such as, for example, the location of the database may be embedded in the collection.

Note that the identifier used by the system to identify the collection of media objects appearing on the sheet may be changed to reflect that the sheet, in newly re-written form, corresponds to a different collection than the one identified by the identifier that appeared on the sheet prior to be re-written. Alternatively, the identifier remains the same.

Figure 5:
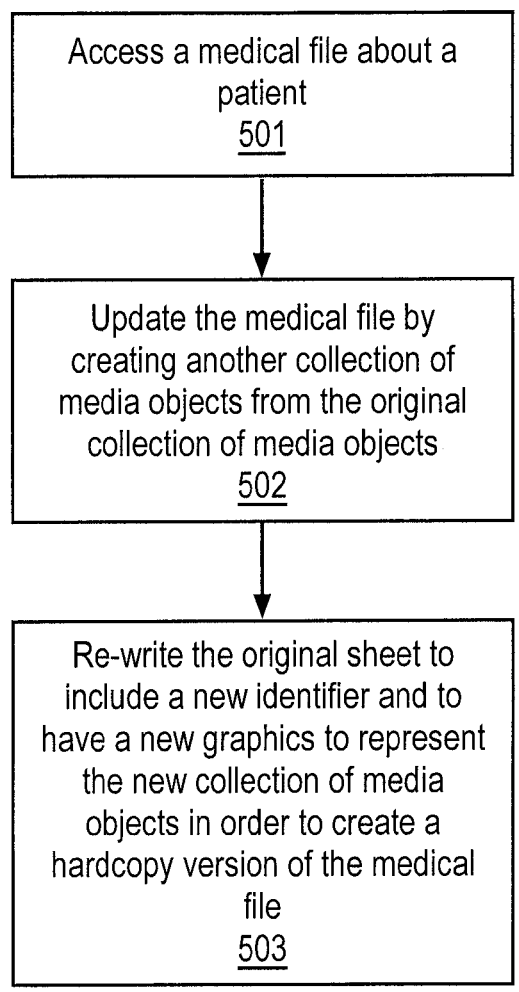
FIG. 5 is a flow diagram of one embodiment of a process for updating patient information.

FIG. 5 is a flow diagram of one embodiment of a process for updating a medical file. The process is performed by processing logic that may comprise hardware (e.g., circuitry, dedicated logic, etc.), software (such as is run on a general purpose computer system or a dedicated machine), or a combination of both. Referring to FIG. 5, the process begins by accessing a medical file about a patient (processing block 501). In one embodiment, the processing logic performs this access by accessing a collection of media objects using a sheet that has an identifier and a graphic that represents the media objects. Next, processing logic updates the medical file by creating another collection of media objects from the original collection of media objects (processing block 502). Once the updated medical file has been created, processing logic re-writes the original sheet to include a new identifier and to have a new graphic to represent the new collection of media objects in order to create a hardcopy version of the medical file (processing block 503). Note that in an alternative embodiment, a new sheet, or an erased version of the original sheet, may be completely re-written to include updated information. This may be useful if another hardcopy version of a medical file is desired and, thus, may be obtained by printing out a stored version of the sheet.

Figure 7:
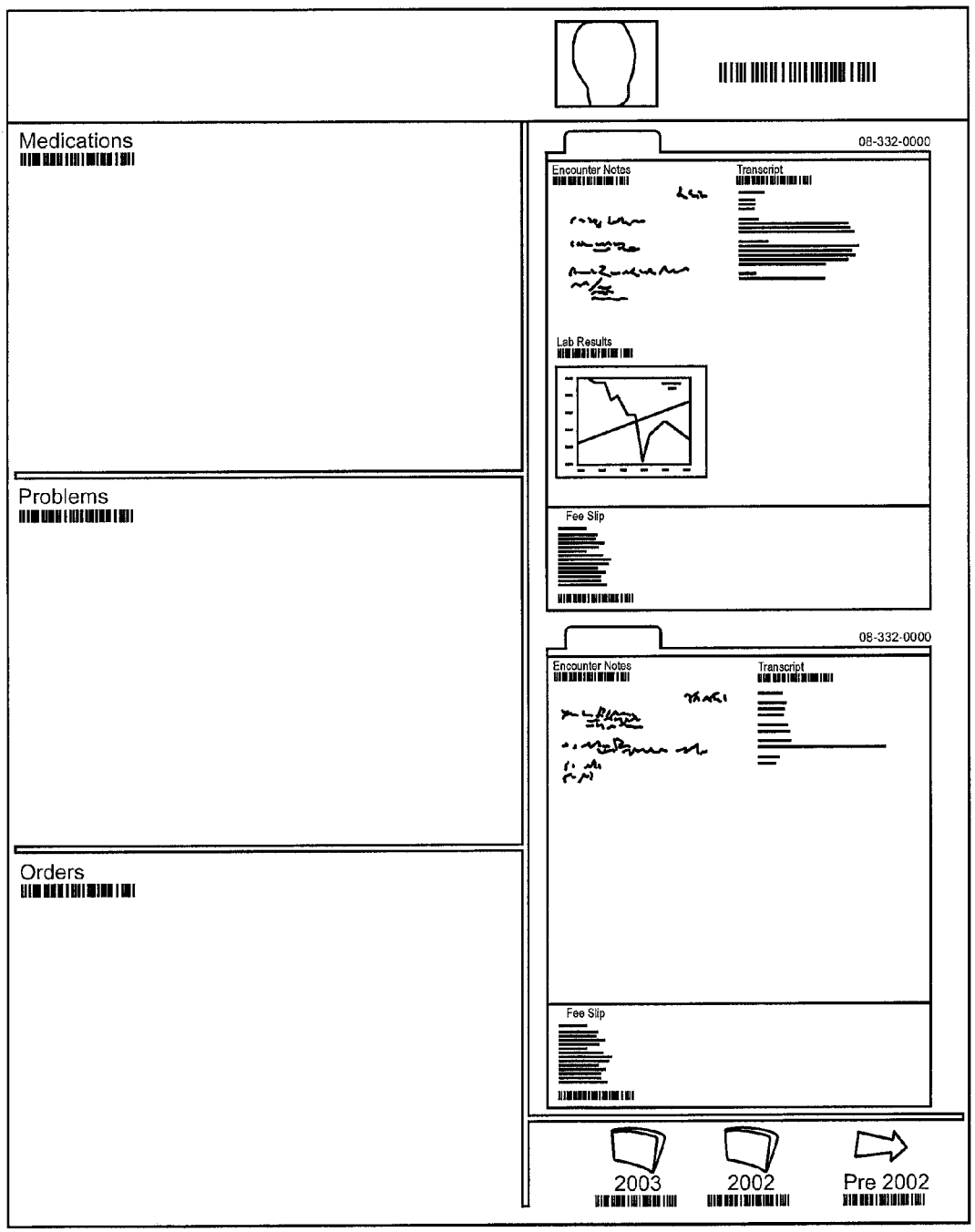
FIG. 7 is an exemplary doctor's cover sheet or "face sheet" for use by a physician's office, to summarize an entire patent's file.
Figure 8:
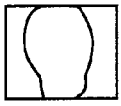
FIG. 8 is an example of the face sheet in FIG. 7 after being updated with information from a patient encounter.

FIG. 7 is an exemplary doctor's cover sheet or "face sheet" for use by a physician's office, to summarize an entire patent's file. Some of the information is updated automatically (e.g., most recent encounter form) and some manually (e.g., writing in the list of "problems"). In this scenario, information may be added to a patient file by first scanning the cover sheet identifier and then scanning additional information. Knowing the current state of the cover sheet, the marking engine is able to identify areas on the cover sheet onto which additional information may be marked. FIG. 8 is an example of the face sheet in FIG. 7 after being updated with information from a patient encounter.

In one embodiment, portions of the medical file cover sheet are not erasable. This may include, for example, the location of a doctor's signature. Similarly, there may be portions of the medical file cover sheet that are not writable. This may include portions of the form that are designated for specific purposes (e.g., signatures).

Permanently Non-re-writable

In one embodiment, there may be a mechanism to make a re-writable sheet permanent (non-re-writable). This would facilitate making a permanent record. In one embodiment, a writeable mark, or flag, that is detectable by a scanner is used to prevent modification of the page (e.g., prevent the eraser from erasing the page and the printer from writing on the page). In one embodiment, a "Do Not Erase" or "read-only" mark is added to the sheet that indicates that the sheet is read-only. In one embodiment, a device adds this mark and the same or a different device erases it. In one embodiment, the processing unit described above checks the scanned image for the "read-only" mark. In another embodiment, the processing unit checks the stored information for a "read-only" mark associated with the identifier of the document. In yet another embodiment, the processing unit may do both.

In one embodiment, the mark is erasable. In the case of having a scanner and a printer in a paper path, the mark is not erased by the printer if seen by the scanner. In one embodiment, if a predetermined potion of the sheet has an indicator (e.g., the corner, such as the upper right corner, is dark or has a certain shape or pattern on it), then the scanner prevents the printer from erasing and printing on the sheet. (Note that the upper right can be the lower-left if the paper is reversed. Therefore, both locations are checked every corner is checked.) Alternatively, every corner of a sheet may be used to locate the mark indicating that the sheet is not erasable. The scanner/printer may have a slot where an individual could insert the sheet to erase the shape or pattern and another slot where the shape or pattern is applied to the sheet. This may operate in the same way as an electronic stapler operates).

Note that this approach doesn't work for bulk erasing (heat up a whole stack of pages at once) unless some type of feeder is used to take in the pages into a bulk eraser.

In an alternative embodiment, the sheet may be made permanent by 1) including a copy of the sheet into regular paper, or 2) causing a physical or material change in the re-writable sheet that prevents it from being erased (e.g., by applying some additional process, such as a particular temperature or chemical, etc.).

In one embodiment, there may be one or more portions of a document that are always re-written. This may include, for example, auto dating a sheet so that each time the sheet is updated, the sheet is marked with a phrase indicating that that "This document has been updated as of (date)" with the date information automatically filled-in. In one embodiment, machine readable data (e.g., bar code) is located on the document and indicates that the latest information is to be printed there. For example, a bar code or other machine readable code may be used at the beginning and ending of a block of text that is always updated with some information, such as, for example, the latest data, author, etc.

In one embodiment, the scanner scans a particular location on the sheet, the erasing unit erases the location, and then the marking unit marks the location with updated information. The updated information may be dependent on the scanned information (e.g., a version number). Alternatively, the updated information may be independent of the scanned information (e.g., a timestamp). Note that in such cases, the scanning of the information may not be necessary in order to update the information. The information may be machine and/or human readable.

An Exemplary Computer System

Figure 9:
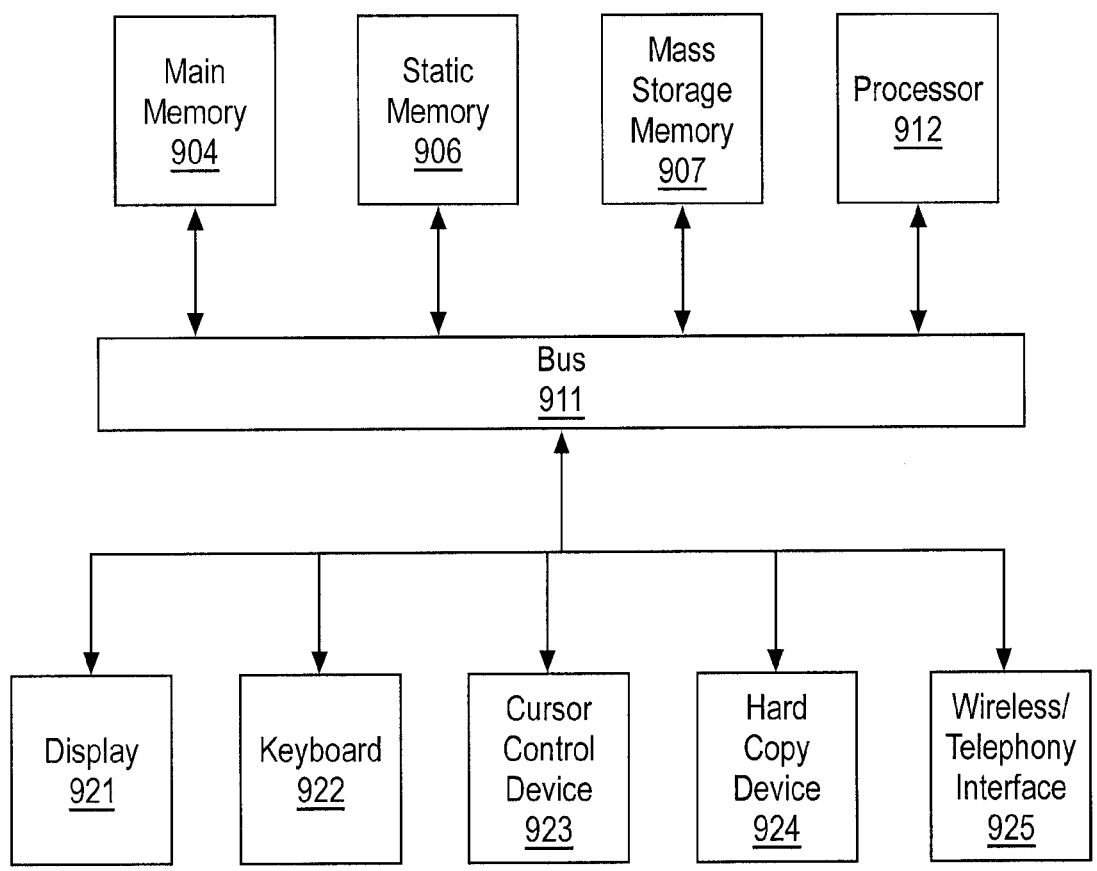
FIG. 9 is a block diagram of an exemplary computer system.

FIG. 9 is a block diagram of an exemplary computer system that may perform one or more of the operations described herein. Referring to FIG. 9, computer system 900 may comprise an exemplary client or server computer system. Computer system 900 comprises a communication mechanism or bus 911 for communicating information, and a processor 912 coupled with bus 911 for processing information. Processor 912 includes a microprocessor, but is not limited to a microprocessor, such as, for example, Pentium™, PowerPC™, Alpha™, etc.

System 900 further comprises a random access memory (RAM), or other dynamic storage device 904 (referred to as main memory) coupled to bus 911 for storing information and instructions to be executed by processor 912. Main memory 904 also may be used for storing temporary variables or other intermediate information during execution of instructions by processor 912.

Computer system 900 also comprises a read only memory (ROM) and/or other static storage device 906 coupled to bus 911 for storing static information and instructions for processor 912, and a data storage device 907, such as a magnetic disk or optical disk and its corresponding disk drive. Data storage device 907 is coupled to bus 911 for storing information and instructions.

Computer system 900 may further be coupled to a display device 921, such as a cathode ray tube (CRT) or liquid crystal display (LCD), coupled to bus 911 for displaying information to a computer user. An alphanumeric input device 922, including alphanumeric and other keys, may also be coupled to bus 911 for communicating information and command selections to processor 912. An additional user input device is cursor control 923, such as a mouse, trackball, trackpad, stylus, or cursor direction keys, coupled to bus 911 for communicating direction information and command selections to processor 912, and for controlling cursor movement on display 921.

Another device that may be coupled to bus 911 is hard copy device 924, which may be used for marking information on a medium such as paper, film, or similar types of media. Another device that may be coupled to bus 911 is a wired/wireless communication capability 925 to communication to a phone or handheld palm device.

Note that any or all of the components of system 900 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims that in themselves recite only those features regarded as essential to the invention.

We claim:

1. A method comprising:
representing a first collection of media objects including one or more first groups of electronic documents by a first graphical content having one or more thumbnails on a first sheet representing media objects, wherein the first sheet is a cover sheet that provides access to the first collection of the media objects, wherein the cover sheet is a non-electronic medium;
scanning a first identifier on the first sheet to identify the first collection of media objects using a scanner configured to scan images; and
adding one or more other media objects to the first collection of media objects that is stored at a remote network location, wherein the first collection of media objects has been identified by the scanning the first sheet to create a second collection of media objects at the remote network location, the second collection of media objects including one or more second groups of electronic documents;
erasing the first sheet; and
re-marking the first sheet that includes printing a second graphical content having one or more second thumbnails representing the second collection of media objects onto the first sheet using a printer, such that the second graphical content is presented on the first sheet in a non-electronic form, and marking the first sheet with a second identifier to identify the second collection and the second graphical content, wherein marking the first sheet comprises identifying open areas on the first sheet based on scanned information and determining where to mark the first sheet based on the open areas, wherein the re-marked first sheet including the second graphical content in the non-electronic form provides access to the second collection of the media objects, wherein the re-marking the first sheet is performed after adding one or more other media objects to the first collection of media objects at the remote network location, wherein the scanning and the re-marking is performed on the same cover sheet by a peripheral device.

2. The method defined in claim 1 wherein the media objects are scanned pages.

3. The method defined in claim 1 wherein the media objects are electronic documents or images from a digital memory card.

4. The method defined in claim 1 further comprising:
accessing the first collection of media objects using the first identifier; and
scanning the one or more pages of the one or more other media objects.

5. The method defined in claim 1 wherein the first identifier and the second identifier are identical.

6. The method defined in claim 1 wherein re-marking the first sheet comprises identifying open areas on the sheet based on scanned information and determining where to mark the sheet based on the open areas.

7. The method defined in claim 1 further comprising accessing the first collection using a first identifier, wherein the first identifier comprises a machine-readable identifier.

8. The method defined in claim 7 wherein the machine-readable identifier comprises a barcode.

9. The method defined in claim 7 wherein the first identifier comprises a radio frequency identifier (RFID).

10. The method defined in claim 1 wherein re-marking the first sheet only occurs in a first mode of operation, and further comprising marking a second sheet with the second graphical content in a second mode of operation, where the second mode is different than the first mode of operation.

11. The method defined in claim 10 wherein marking the second sheet with the second graphical content occurs while erasing the first sheet.

12. The method defined in claim 1 wherein the first sheet comprises a medical information of a patient.

13. The method defined in claim 12 wherein the first collection of media objects comprises patient objects regarding a patient, and further wherein the second collection of media objects represents an updated version of the patient objects for the patient.

14. The method defined in claim 1 further comprising marking the sheet with a machine-readable indicator that indicates that the sheet is not to be erased.

15. The method defined in claim 14 wherein the indicator is erasable.

16. The method defined in claim 14 wherein the indicator is one of a predetermined shape, pattern, or color.

17. An article of manufacture having one or more non-transitory recordable media storing instructions thereon which, when executed by a system, cause the system to perform a method comprising:
representing a first collection of media objects including one or more first groups of electronic documents by a first graphical content having one or more first thumbnails on a first sheet representing the media objects, wherein the first sheet is a cover sheet that provides access to the first collection of the media objects, wherein the cover sheet is a non-electronic medium;
scanning a first identifier on the first sheet to identify the first collection of media objects using a scanner configured to scan images; and
adding one or more other media objects to the first collection of media objects that is stored at a remote network location, wherein the first collection of media objects has been identified by the scanning the first sheet to create a second collection of media objects at the remote network location, the second collection of media objects including one or more second groups of electronic documents;

erasing the first sheet; and re-marking the first sheet that includes printing a second graphical content representing the second collection of media objects onto the first sheet using a printer, such that the second graphical content is presented on the first sheet in a non-electronic form, and marking the first sheet with a second identifier to identify the second collection and the second graphical content, wherein marking the first sheet comprises identifying open areas on the first sheet based on scanned information and determining where to mark the first sheet based on the open areas, wherein the re-marked first sheet including the second graphical content in the non-electronic form provides access to the second collection of the media objects, wherein the re-marking the first sheet is performed after adding one or more other media objects to the first collection of media objects at the remote network location, wherein the scanning and the re-marking is performed on the same cover sheet by a peripheral device.

18. The article of manufacture defined in claim 17 wherein the first identifier and the second identifier are identical.

19. The article of manufacture defined in claim 17 wherein the method further comprises:

accessing the first collection of media objects using the first identifier; and scanning the one or more pages of the one or more other media objects.

20. The article of manufacture defined in claim 19 wherein re-marking the first sheet comprises identifying open areas on the sheet based on scanned information and determining where to mark the sheet based on the open areas.

21. The article of manufacture defined in claim 16 wherein the method further comprises accessing the first collection using a first identifier, and wherein the first identifier comprises a machine-readable identifier.

22. The article of manufacture defined in claim 21 wherein the machine-readable identifier comprises a barcode.

23. The article of manufacture defined in claim 21 wherein the first identifier comprises a radio frequency identifier (RFID).

24. The article of manufacture defined in claim 16 wherein re-marking the first sheet only occurs in a first mode of operation, and further wherein marking the second graphical content on a second sheet in a second mode of operation different than the first mode of operation.

25. The article of manufacture defined in claim 24 wherein marking the second graphical content on the second sheet occurs while erasing the first sheet.

26. The article of manufacture defined in claim 16 wherein the first sheet comprises patient objects regarding patient information of a patient and re-marking the first sheet results in updating the patient information.

27. The article of manufacture defined in claim 26 wherein the first collection of media objects comprises patient objects regarding a patient, and further wherein the second collection of media objects represents an updated version of the patient objects for the patient.

28. A multifunction peripheral device comprising:

a memory to store an image of a first sheet that is a cover sheet representing media objects, wherein the first sheet has a first graphical content having one or more first thumbnails representing a first collection of media objects including one or more first groups of electronic documents;

a processing unit coupled to the memory;

a scanner configured to scan images that is coupled to the processing unit to scan the first sheet, wherein the first sheet is a non-electronic medium; wherein the processing unit is configured to scan a first identifier on the first sheet to identify the first collection of media objects; and to add one or more other media objects to the first collection of media objects that is stored at a remote network location, wherein the first collection of media objects has been identified by the scanning the first sheet to create a second collection of media objects at the remote network location, the second collection of media objects including one or more second groups of electronic documents;

an erasing unit to erase the first sheet and;

a marking engine to re-mark the first sheet, wherein the marking engine includes a printer to print a second graphical content having one or more second thumbnails representing the second collection of media objects onto the first sheet, such that the second graphical content is presented on the first sheet in a non-electronic form, and the marking engine marks the first sheet with a second identifier to identify the second collection and the second graphical content, wherein marking the first sheet comprises identifying open areas on the first sheet based on scanned information and determining where to mark the first sheet based on the open areas, wherein the re-marked first sheet including the second graphical content in the non-electronic form provides access to the second collection of the media objects, wherein the marking engine is configured to re-mark the first sheet after adding one or more other media objects to the first collection of media objects at the remote network location, wherein the scanning and the re-marking is performed on the same cover sheet by the multifunction peripheral device.

29. The apparatus defined in claim 28 wherein the first sheet has a first identifier to identify the first collection, and wherein the first identifier comprises a machine-readable identifier.

30. The apparatus defined in claim 29 wherein the machine-readable identifier comprises a barcode.

31. The apparatus defined in claim 28 wherein the first sheet has a first identifier to identify the first collection, and wherein the first identifier comprises a radio frequency identifier (RFID).

32. The apparatus defined in claim 28 wherein the first identifier and a second identifier to identify the second collection are identical.

33. The apparatus defined in claim 28 wherein the first sheet comprises representations of objects related to patient information and re-marking the first sheet results in updating the medical file.

34. A multifunction peripheral device comprising:

means for representing a first collection of media objects including one or more first groups of electronic documents using a first graphical content having one or more first thumbnails on a first sheet representing the media objects, wherein the first sheet is a cover sheet that provides access to the first collection of the media objects, wherein the cover sheet is a non-electronic medium;

means for scanning a first identifier on the first sheet to identify the first collection, wherein the means for scanning is configured to scan images; and means for adding one or more other media objects to the first collection that is stored at the remote network location, wherein the first collection of media objects has been identified by the means for scanning the first sheet to create a second collection of media objects at the remote network location, the second collection of media objects including one or more second groups of electronic documents;

means for erasing the first sheet; and means for re-marking the first sheet that includes a printer to print a second graphical content having one or more second thumbnails representing the second collection of media objects onto the first sheet, such that the second graphical content is presented on the first sheet in a non-electronic form, and means for marking the first sheet with a second identifier to identify the second collection and the second graphical content, wherein means for marking the first sheet comprises means for identifying open areas on the first sheet based on scanned information and determining where to mark the first sheet based on the open areas, wherein the re-marked first sheet including the second graphical content in the non-electronic form provides access to the second collection of the media objects, wherein the re-marking the first sheet is performed after adding one or more other media objects to the first collection of media objects at the remote network location, wherein the scanning and the re-marking is performed on the same cover sheet by the multifunction peripheral device.

35. A multifunction peripheral device comprising:

a scanner to scan a sheet representing a first collection of media objects including one or more first groups of electronic documents by a first graphical content having one or more first thumbnails on the sheet in a non-electronic form, wherein the scanner is configured to scan images, wherein the sheet is a cover sheet that provides access to the first collection of the media objects, wherein the cover sheet is a non-electronic medium;

an erasing unit coupled to receive the sheet from the scanner to erase at least a portion of the first graphical content in the non-electronic form from the sheet;

a processing unit to modify the first collection of media objects by adding one or more pages of the one or more other media objects to the first collection of media objects that is stored at a remote network location to create a second collection of media objects at the remote network location, the second collection of media objects including one or more second groups of electronic documents, wherein the first collection of media objects has been identified by the scanning a first identifier on the first sheet using the scanner configured to scan the images; and a marking unit to re-mark the sheet that includes a printer to print a second graphical content representing the second collection of media objects and a second identifier to identify the second graphical content and the second collection of media objects onto the sheet in a non-electronic form by identifying open areas on the first sheet based on scanned information and determining where to mark the first sheet based on the open areas, wherein the re-marked first sheet including the second identifier and the second graphical content in the non-electronic form provides access to the second collection of the media objects, wherein the marking unit is configured to re-mark the first sheet after adding one or more other media objects to the first collection of media objects at the remote network location, wherein the scanning, the erasing, and the re-marking is performed on the same cover sheet by the multifunction peripheral device.

36. The apparatus defined in claim 35 wherein the processing unit is operable to decode a collection identifier and to access the first collection of media objects based in the collection identifier.

37. The apparatus defined in claim 35 wherein the collection identifier comprises a barcode.

38. The apparatus defined in claim 35 further comprising a scanned sheet feeder coupled to the scanner to send the sheet to the erasing unit if the sheet is re-writable.

39. A method comprising:

accessing information corresponding to a patient by accessing a first collection of media objects including one or more first groups of electronic documents using a first sheet that has a first identifier and a first graphical content having one or more first thumbnails in a non-electronic form representing the first collection of media objects, wherein the first sheet is a cover sheet that provides access to the first collection of the media objects, wherein the cover sheet is a non-electronic medium;

scanning the first sheet to identify the first collection using a scanner configured to scan images; and adding one or more other media objects to the first collection that is stored at a remote network location, wherein the first collection of media objects has been identified by the scanning the first sheet, to create a second collection of media objects at the remote network location, the second collection of media objects including one or more second groups of electronic documents;

erasing the first sheet; and re-marking the first sheet that includes printing a second graphical content having one or more second thumbnails representing the second collection of media objects and a second identifier to identify the second collection and the second graphical content in a non-electronic form onto the first sheet using a printer in order to create a hardcopy version of the medical file by identifying open areas on the first sheet based on scanned information and determining where to mark the first sheet based on the open areas, wherein the re-marked first sheet including the second identifier and the second graphical content in the non-electronic form provides access to the second collection of the media objects, wherein the re-marking the first sheet is performed after adding one or more other media objects to the first collection of media objects at the remote network location, wherein the scanning and the re-marking is performed on the same cover sheet by a peripheral device.

40. The method defined in claim 39 wherein the second collection comprises one or more documents regarding the patient.

41. An article of manufacture having one or more non-transitory recordable media storing instructions thereon which, when executed by a system, cause the system to perform a method comprising:

accessing information corresponding to a patient by accessing a first collection of media objects including one or more first groups of electronic documents using a first sheet that has a first identifier and a first graphical content having one or more first thumbnails in a non-electronic form representing the first collection of media objects, wherein the first sheet is a cover sheet that provides access to the first collection of the media objects, wherein the cover sheet is a non-electronic medium;

scanning the first sheet to identify the first collection using a scanner configured to scan images;

adding one or more other media objects to the first collection that is stored at a remote network location, wherein the first collection of media objects has been identified by the scanning the first sheet, to create a second collection of media objects at the remote network location, the second collection of media objects including one or more second groups of electronic documents;

erasing the first sheet; and re-marking the first sheet that includes printing a second graphical content having one or more second thumbnails representing the second collection of media objects and a second identifier to identify the second collection and the second graphical content in a non-electronic form onto the first sheet using a printer in order to create a hardcopy version of the medical file by identifying open areas on the first sheet based on scanned information and determining where to mark the first sheet based on the open areas, wherein the re-marked first sheet including the second identifier and the second graphical content in the non-electronic form provides access to the second collection of the media objects, wherein the re-marking the first sheet is performed after adding one or more other media objects to the first collection of media objects at the remote network location, wherein the scanning and the re-marking is performed on the same cover sheet by a peripheral device.

42. A method comprising:

representing a first collection of media objects including one or more first groups of electronic documents on a sheet using an image including one or more first thumbnails, wherein the sheet is a cover sheet that provides access to the first collection of the media objects, and wherein the cover sheet is a non-electronic medium;

scanning the image of the first collection representation on the sheet using a scanner configured to scan images;

identifying the first collection based on the scanned image;

adding one or more other media objects to the first collection of media objects that is stored at a remote network location, wherein the first collection of media objects has been identified by the scanned image, to create a second collection of media objects at the remote network location, the second collection of media objects including one or more second groups of electronic documents;

erasing the sheet; and re-marking the sheet that includes printing a second graphical content having one or more second thumbnails to represent the second collection, such that the second graphical content is presented on the sheet in a non-electronic form using a printer, and marking the sheet with an identifier to identify the second collection and the second graphical content, wherein marking the first sheet comprises identifying open areas on the sheet based on scanned information and determining where to mark the sheet based on the open areas, wherein the re-marked sheet including the second graphical content in the non-electronic form provides access to the second collection of the media objects, wherein the re-marking the sheet is performed after adding one or more other media objects to the first collection of media objects at the remote network location, wherein the scanning and the re-marking is performed on the same cover sheet by a peripheral device.

43. The method defined in claim 42 further comprising determining a difference between representations for the first and second collections; and erasing a portion of the sheet based on the difference between the representations of the first and second collections.

44. A method comprising:

scanning, using a scanner configured to scan images, a portion of a sheet having a non-electronic representation of a first collection of media objects including one or more first groups of documents and a first identifier to identify the first collection of media objects;

adding one or more other media objects to the first collection of media objects that is stored at a remote network location, wherein the first collection of media objects has been identified by the scanning the sheet, to create a second collection of media objects at the remote network location, the second collection of media objects including one or more second groups of documents;

erasing the portion of the sheet having the non-electronic representation of the first collection of media objects, wherein the representation includes a first graphical content having one or more first thumbnails to represent the first collection of the media objects in a non-electronic form, wherein the sheet is a cover sheet including the first graphical content in the non-electronic form that provides access to the first collection of the media objects, wherein the sheet is a non-electronic medium; and marking the portion of the sheet with updated information that includes printing, using a printer, a second graphical content including one or more second thumbnails and a second identifier to identify the second collection and the second graphical content onto the portion of the sheet in a non-electronic form file by identifying open areas on the first sheet based on scanned information and determining where to mark the first sheet based on the open areas, wherein the second graphical content is associated with the updated information, wherein the marking the portion of the sheet is performed after adding one or more other media objects to the first collection of media objects at the remote network location, wherein the scanning, the erasing, and the marking is performed on the same sheet by a peripheral device.

45. The method defined in claim 44 wherein the updated information further comprises a timestamp.

46. The method defined in claim 44 wherein the scanning the portion of the sheet is performed, prior to erasing, to obtain scanned information, and wherein the updated information is based on the scanned information.

* * * * *